(12) United States Patent
Gopireddy

(10) Patent No.: US 11,379,560 B2
(45) Date of Patent: Jul. 5, 2022

(54) SYSTEMS AND METHODS FOR LICENSE ANALYSIS

(71) Applicant: ServiceNow, Inc., Santa Clara, CA (US)

(72) Inventor: Samyuktha Reddy Gopireddy, San Ramon, CA (US)

(73) Assignee: ServiceNow Inc., Santa Clara, CA (US)

( * ) Notice: Subject to any disclaimer, the term of this patent is extended or adjusted under 35 U.S.C. 154(b) by 511 days.

(21) Appl. No.: 16/356,909

(22) Filed: Mar. 18, 2019

(65) Prior Publication Data

US 2020/0302032 A1    Sep. 24, 2020

(51) Int. Cl.
*G06F 21/10* (2013.01)
*G06F 21/62* (2013.01)
*G06F 21/60* (2013.01)

(52) U.S. Cl.
CPC .......... *G06F 21/105* (2013.01); *G06F 21/629* (2013.01); *G06F 21/604* (2013.01); *G06F 2221/0773* (2013.01)

(58) Field of Classification Search
CPC .... G06F 21/105; G06F 21/629; G06F 21/604; G06F 2221/0773
See application file for complete search history.

(56) References Cited

U.S. PATENT DOCUMENTS

| | | | | |
|---|---|---|---|---|
| 5,845,281 | A * | 12/1998 | Benson | ............... G06F 21/6236 707/999.009 |
| 6,189,146 | B1 * | 2/2001 | Misra | ..................... G06Q 30/06 717/177 |
| 6,321,229 | B1 | 11/2001 | Goldman et al. | |
| 6,609,122 | B1 | 8/2003 | Ensor | |
| 6,799,189 | B2 | 9/2004 | Huxoll | |
| 6,813,640 | B1 * | 11/2004 | Benson | ................ G06F 9/4488 707/999.009 |
| 6,816,898 | B1 | 11/2004 | Scarpelli | |
| 6,895,586 | B1 | 5/2005 | Brasher | |
| 7,020,706 | B2 | 3/2006 | Cates | |
| 7,027,411 | B1 | 4/2006 | Pulsipher | |

(Continued)

OTHER PUBLICATIONS

International Search Report and Written Opinion for PCT Application No. PCT/US2020/023198 dated Jun. 9, 2020; 14 pgs.

*Primary Examiner* — David Garcia Cervetti
(74) *Attorney, Agent, or Firm* — Fletcher Yoder PC

(57) ABSTRACT

In accordance with the present approach, a license analysis system may receive user activity data for a software program from an enterprise or client, including a client-specific association between license types and user assignments. The user assignments may include roles, profiles, and/or authorization objects assigned to each user within the software program. The license analysis system may analyze the user activity data to generate one or more 1:m relationships of each license type to a number of user assignments within the enterprise. The license analysis system may then compare the 1:m relationships to the user activity data to identify an acceptable license type assignment for each user that provides appropriate software authorizations according to their historic software usage. By providing the acceptable license type assignments to the enterprise, the license analysis system enables the enterprise to improve or optimize its license distribution by closely matching users with appropriate license types.

20 Claims, 12 Drawing Sheets

(56) References Cited

U.S. PATENT DOCUMENTS

| | | | |
|---|---|---|---|
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,457,781 B1* | 11/2008 | Weaver | G06Q 20/382 705/64 |
| 7,610,512 B2 | 10/2009 | Gerber | |
| 7,617,073 B2 | 11/2009 | Non | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidar | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers et al. | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,839,360 B1* | 9/2014 | Orr | G06F 21/33 726/4 |
| 8,887,133 B2 | 11/2014 | Behnia | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,457,344 B2 | 10/2016 | Gere | |
| 9,535,737 B2 | 1/2017 | Joy | |
| 9,557,969 B2 | 1/2017 | Sharma | |
| 9,613,070 B2 | 4/2017 | Kumar | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 2003/0066048 A1* | 4/2003 | Kumhyr | G06F 8/71 717/101 |
| 2003/0083892 A1* | 5/2003 | Ramachandran | G06Q 30/06 705/26.1 |
| 2003/0083994 A1* | 5/2003 | Ramachandran | G06F 21/10 705/52 |
| 2003/0083995 A1* | 5/2003 | Ramachandran | G06Q 30/04 705/52 |
| 2003/0083998 A1* | 5/2003 | Ramachandran | G06F 21/10 705/59 |
| 2003/0083999 A1* | 5/2003 | Ramachandran | G06F 21/10 705/59 |
| 2003/0084060 A1* | 5/2003 | Ramachandran | G06Q 30/04 707/999.102 |
| 2003/0084145 A1* | 5/2003 | Ramachandran | H04L 29/06 709/224 |
| 2003/0084341 A1* | 5/2003 | Ramachandran | G06Q 30/02 726/4 |
| 2003/0084343 A1* | 5/2003 | Ramachandran | H04L 63/08 709/217 |
| 2003/0220880 A1* | 11/2003 | Lao | H04L 63/10 705/51 |
| 2004/0039916 A1* | 2/2004 | Aldis | G06F 21/105 713/177 |
| 2004/0044631 A1* | 3/2004 | Walker | G06F 21/10 705/59 |
| 2004/0054930 A1* | 3/2004 | Walker | H04L 29/0602 713/165 |
| 2004/0193545 A1* | 9/2004 | Shlasky | G06F 21/125 705/59 |
| 2004/0220878 A1* | 11/2004 | Lao | H04L 63/20 705/51 |
| 2005/0044396 A1* | 2/2005 | Vogel | G06F 21/6218 726/6 |
| 2005/0044426 A1* | 2/2005 | Vogel | G06F 21/6218 726/19 |
| 2005/0102240 A1* | 5/2005 | Misra | G06Q 30/06 705/59 |
| 2005/0114661 A1* | 5/2005 | Cheng | G06F 21/6218 713/167 |
| 2006/0156020 A1* | 7/2006 | Minium | G06F 21/6218 713/182 |
| 2006/0156021 A1* | 7/2006 | Minium | H04L 63/102 713/182 |
| 2006/0156384 A1* | 7/2006 | Minium | G06F 21/6218 726/2 |
| 2006/0190408 A1* | 8/2006 | Cook | G06Q 30/06 705/59 |
| 2006/0200419 A1* | 9/2006 | Cook | G06Q 10/00 705/59 |
| 2007/0011748 A1* | 1/2007 | Tiwari | G06F 21/105 726/26 |
| 2007/0130068 A1* | 6/2007 | Kitazato | H04N 21/835 375/E7.009 |
| 2007/0198422 A1* | 8/2007 | Prahlad | G06F 21/10 705/52 |
| 2007/0288386 A1* | 12/2007 | Adachi | H04L 9/0825 705/58 |
| 2008/0083040 A1* | 4/2008 | Dani | H04L 9/3231 726/28 |
| 2008/0243699 A1* | 10/2008 | Hilerio | G06F 21/105 705/58 |
| 2008/0244754 A1* | 10/2008 | Curren | G06F 21/105 726/27 |
| 2010/0319067 A1* | 12/2010 | Mohanty | H04L 63/101 726/21 |
| 2011/0047540 A1* | 2/2011 | Williams | G06F 8/61 715/740 |
| 2012/0084393 A1* | 4/2012 | Williams | G06F 8/61 709/224 |
| 2012/0089485 A1* | 4/2012 | Williams | G06F 8/61 705/26.61 |
| 2012/0089971 A1* | 4/2012 | Williams | G06F 8/61 717/177 |
| 2012/0198559 A1* | 8/2012 | Venkata Naga Ravi | G06F 21/62 726/26 |
| 2012/0204270 A1* | 8/2012 | Paulino | G06F 21/105 726/28 |
| 2012/0317621 A1* | 12/2012 | Mihara | G06F 21/6218 726/4 |
| 2013/0144742 A1* | 6/2013 | Thakur | G06F 21/105 705/26.1 |

(56) References Cited

U.S. PATENT DOCUMENTS

| | | | |
|---|---|---|---|
| 2014/0013440 A1* | 1/2014 | Thakur | G06F 21/105 |
| | | | 726/27 |
| 2015/0135333 A1* | 5/2015 | Biswas | H04L 63/102 |
| | | | 726/28 |
| 2016/0057151 A1* | 2/2016 | Brock | H04L 67/02 |
| | | | 726/4 |
| 2016/0092887 A1* | 3/2016 | Jagad | G06F 8/61 |
| | | | 705/59 |
| 2016/0105409 A1* | 4/2016 | Torman | H04L 63/20 |
| | | | 726/6 |
| 2016/0294881 A1* | 10/2016 | Hua | H04L 63/102 |
| 2017/0063615 A1* | 3/2017 | Yang | H04L 41/5054 |
| 2017/0214632 A1* | 7/2017 | Ravi | H04L 41/5054 |
| 2017/0300668 A1* | 10/2017 | Bawa | G06F 21/105 |
| 2017/0300672 A1* | 10/2017 | Kauerauf | G06F 21/629 |
| 2017/0308685 A1* | 10/2017 | Terry | G06F 21/105 |
| 2017/0308687 A1* | 10/2017 | Marnell | G06F 21/6218 |
| 2018/0144150 A1* | 5/2018 | Aakolk | G06F 16/282 |
| 2018/0268124 A1* | 9/2018 | Ohzaki | H04L 63/0807 |
| 2018/0322260 A1* | 11/2018 | Adam | G06F 21/604 |
| 2019/0026484 A1* | 1/2019 | Aakolk | H04L 63/10 |
| 2019/0253430 A1* | 8/2019 | Gamache | H04L 63/104 |
| 2019/0297085 A1* | 9/2019 | De Wijs | H04L 63/102 |
| 2019/0318064 A1* | 10/2019 | Paladino | G06F 11/3006 |
| 2019/0340271 A1* | 11/2019 | Faulhaber | G06F 16/2455 |
| 2019/0340337 A1* | 11/2019 | Faulhaber | G06F 21/105 |
| 2019/0340557 A1* | 11/2019 | Faulhaber | G06F 16/2264 |
| 2021/0176638 A1* | 6/2021 | Heldt-Sheller | H04L 67/34 |

* cited by examiner

| USER | ROLE |
|---|---|
| BOB | ROLE1 |
| SAM | ROLE2 |
| ABEL | ROLE3 |
| SUSIE | ROLE4 |

| ROLE | LICENSE TYPE |
|---|---|
| ROLE1 | PROFESSIONAL |
| ROLE2 | LIMITED PROF. |
| ROLE3 | LIMITED PROF. |
| ROLE4 | |

| LICENSE TYPE | ROLE |
|---|---|
| LIMITED PROF. | ROLE1, ROLE2 |
| PROFESSIONAL | ROLE2, ROLE5, ROLE4 |
| SELF-SERVICE | ROLE3 |

| USER | ROLE | ACTUAL LICENSE TYPE ASSIGNMENT | ACCEPTABLE LICENSE TYPE ASSIGNMENT | POTENTIAL SAVINGS |
|---|---|---|---|---|
| BOB | ROLE1 | PROFESSIONAL | LIMITED PROF. | $250 |
| SAM | ROLE2 | PROFESSIONAL | LIMITED PROF. | $250 |
| ABEL | ROLE3 | LIMITED PROF. | SELF-SERVICE | $500 |
| SUSIE | ROLE4 | PROFESSIONAL | PROFESSIONAL | $0 |

DISPLAY ROLE: AUTHORIZATIONS

OPEN CHANGED MAINTAINED ORGANIZATIONAL LEVELS... INFORMATION TRACE

MAINT.: 0 UNMAINT./ORG. LEVELS 0 OPEN FIELDS, STATUS: UNCHANGED

X_CASHPOS_FIORI_MANAGER — CASH POSITION APPS MANAGER CATALOG & GROUP ROLE — 514

- MANUALLY CROSS-APPLICATION AUTHORIZATION OBJECTS AAAB
  - MANUALLY CHECK AT START OF EXTERNAL SERVICES S_SERVICE
    - STANDARD CHECK AT START OF EXTERNAL SERVICES 06B15A359097794 3AF615F2F1A5A84, 073C4A6287B2CB96BE0AFEE76BB9 ⟨...⟩ SRV_NAME
      - PROGRAM, TRANSACTION OR FUNCTI T-ED59030800 SRV_TYPE
      - TYPE OF CHECK FLAG AND AUTHOR! HT
    - MANUALLY CHECK AT START OF EXTERNAL SERVICES * T-ED59030801 SRV_NAME
      - PROGRAM, TRANSACTION OR FUNCTI * SRV_TYPE
      - TYPE OF CHECK FLAG AND AUTHOR!
  - STANDARD TRANSACTION CODE CHECK AT TRANSACTION START S_TCODE
- MANUALLY BASIS: ADMINISTRATION BC_A
- MAINTAINED BASIS – DEVELOPMENT ENVIRONMENT BC_C
- STANDARD BASIS – CENTRAL FUNCTIONS BC_Z
- STANDARD CONTROLLING CO
- CHANGED FINANCIAL ACCOUNTING FI
- MANUALLY BUSINESS INFORMATION WAREHOUSE RS 530, 532

FIG. 11

| DISPLAY USERS | | | | |
|---|---|---|---|---|
| USER | USER 1 | | | |
| CHANGED BY | USER 1 | 2018.09.12 | 15:14:28 | STATUS SAVED — 554 |

DOCUMENTA... / ADDRESS / LOGIN DATA / SNC / DEFAULTS / PARAMETERS / ROLES / PROFILES / GROUPS / PERSONALIZATION / LIC. DATA

ASSIGNED AUTHORIZATION PROFILES

| PROFILE — 552 | TYPE | TEXT |
|---|---|---|
| SAP_ALL | | ALL SAP SYSTEM AUTHORIZATIONS |
| T-ED350441 | ⊕ | PROFILE FOR ROLE XBC_ECC_ECC_ABAP_ALL_DSP |
| T-ED350442 | ⊕ | PROFILE FOR ROLE XBC_ECC_ECC_FI_ALL_DSP |
| T-ED3504421 | ⊕ | PROFILE FOR ROLE XBC_ECC_ECC_FI_ALL_DSP |
| T-ED3504422 | ⊕ | PROFILE FOR ROLE XBC_ECC_ECC_FI_ALL_DSP |
| T-ED3504423 | ⊕ | PROFILE FOR ROLE XBC_ECC_ECC_FI_ALL_DSP |
| T-ED3504424 | ⊕ | PROFILE FOR ROLE XBC_ECC_ECC_FI_ALL_DSP |
| T-ED3504425 | ⊕ | PROFILE FOR ROLE XBC_ECC_ECC_FI_ALL_DSP |
| T-ED350443 | ⊕ | PROFILE FOR ROLE XBC_ECC_ECC_LOGISTICS_ALL_DSP |
| T-ED3504431 | ⊕ | PROFILE FOR ROLE XBC_ECC_ECC_LOGISTICS_ALL_DSP |
| T-ED3504432 | ⊕ | PROFILE FOR ROLE XBC_ECC_ECC_LOGISTICS_ALL_DSP |
| T-ED3504433 | ⊕ | PROFILE FOR ROLE XBC_ECC_ECC_LOGISTICS_ALL_DSP |
| T-ED3504434 | ⊕ | PROFILE FOR ROLE XBC_ECC_ECC_LOGISTICS_ALL_DSP |
| T-ED350459 | ⊕ | PROFILE FOR ROLE XBC_ECC_ECC_ENDUSER_BASIC |
| T-ED350616 | ⊕ | PROFILE FOR ROLE XBC_ECC_ITAPS_ZTCODES_DSP |

550

SYSTEMS AND METHODS FOR LICENSE ANALYSIS

BACKGROUND

The present disclosure relates generally to analysis of software licenses.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

As part of performing these core functions, certain enterprise and other organization users may purchase software licenses from software publishers to gain permission to use proprietary software applications on their end-user or client devices. For organizations having a large number of personnel, managing the maintenance of appropriate software licenses for even a few software applications may represent a significant undertaking. Indeed, because many software applications are available in multiple editions each having varying functionalities and corresponding costs, providing users with appropriate editions of the software applications that suit their respective roles within the enterprise may be difficult to realize in practice.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach relates generally to a license analysis system for evaluating software usage to identify an ideal license type for each user of an enterprise. For example, a software application may be available in a number of different license types or Named Users, including developer, professional, limited professional, employee self-service, and so forth. Because some users may not utilize a full functionality of the license types they are provided, the enterprise may desire to redistribute licenses or reduce costs associated with the software application by downgrading a license type of these users.

Accordingly, the license analysis system may receive user activity data from the enterprise or client, including a client-specific association between license types and the roles assigned to each license type. The license analysis system may analyze the user activity data to generate a 1:m relationship or mapping of each license type to a number of roles within the enterprise. For example, the license analysis system may create a role map that indicates users having a professional license type are associated with a first role and a second role, while users having a limited professional license type are associated with the second role and a third role. The license analysis system may then compare the role map to the user activity data to identify an optimum license type assignment for each user that provides the appropriate authorizations according to their historic software usage. For example, if a user according to the example above has the professional license type but only performs functions associated with the second role, the license analysis system may suggest downgrading the user to the limited professional license type. Instead of or in addition to consideration of the roles of each user, analogous determinations may be based on a profile of each user and/or authorization objects for each user. The license analysis system therefore enables the enterprise to improve or optimize its license distribution by closely matching users with appropriate license types.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 7 is a schematic diagram of an embodiment of relationships used and created by the license analysis system, in accordance with aspects of the present disclosure;

FIG. 10 is a screenshot of an embodiment of a user interface having a hierarchy of authorization objects associated with a user role that may be analyzed by the license analysis system, in accordance with aspects of the present disclosure;

FIG. 11 is a screenshot of an embodiment of a user interface having a list of user profiles that may be analyzed by the license analysis system, in accordance with aspects of the present disclosure.

DETAILED DESCRIPTION

Figure 1:
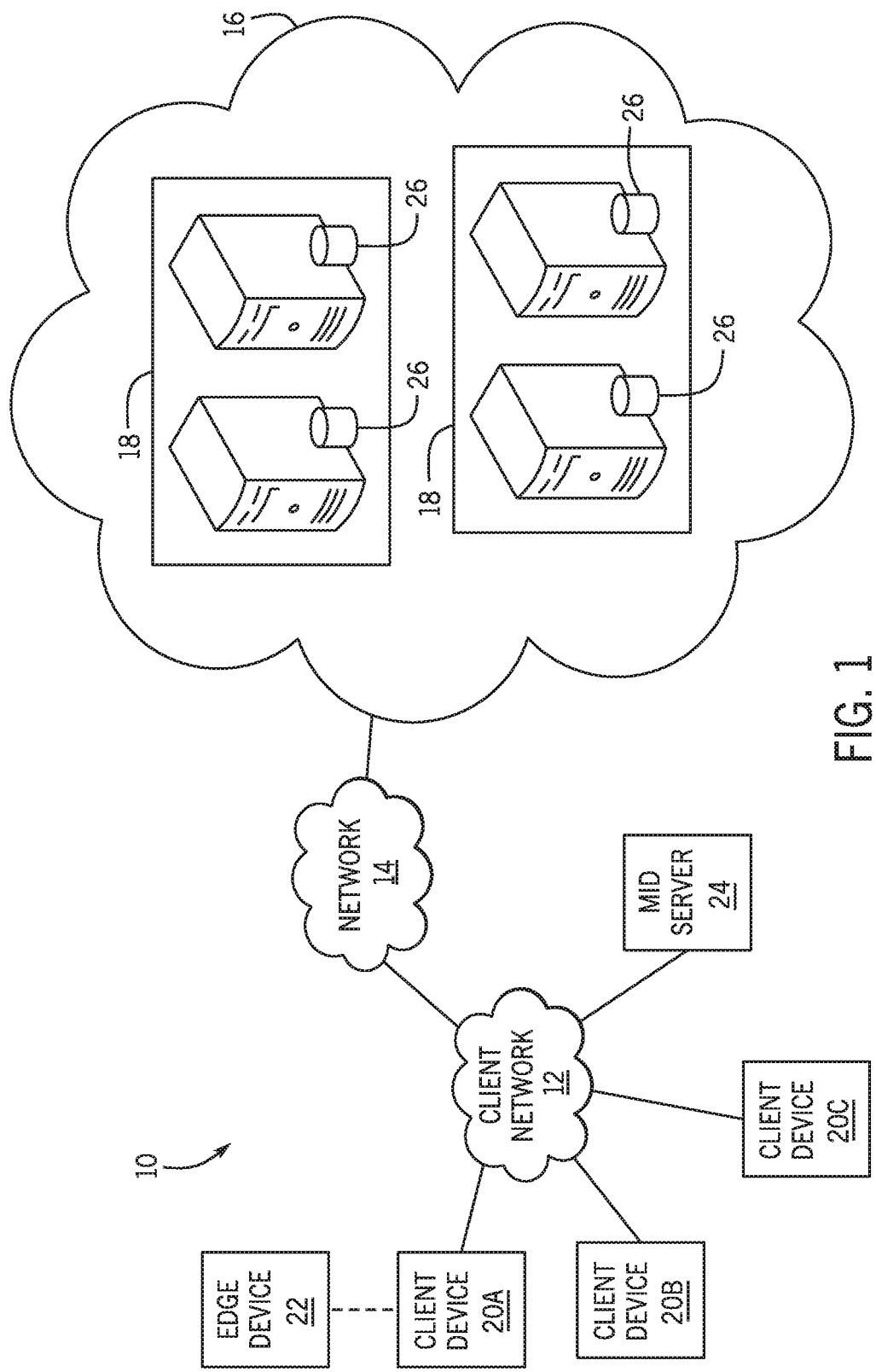
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Furthermore, as used herein, the term "license type" or "edition" refers to the bundling, packaging, or selling of a respective software program for different experiences or degrees of completeness. As such, it is to be understood that a software program may be available in multiple license types that each are targeted to a different segments of end-users. Some examples of license types include developer, professional, limited professional, employee self-service, standard, home, education, enterprise, and so forth. Moreover, respective software licenses that accompany various software programs may differ in pricing for different license types, such that higher-end or more complete license types of a respective software program are more expensive than lower-end or less complete license types of the same software program. In some cases, license types are associated with a "named user," such that the license type is provided as a named user license assigned to a particular user.

As discussed herein, an enterprise or other client may use certain software programs that are installed on client devices directly and/or accessible through cloud-provided services. In either case, to provide users with a desired set of features, the software programs may be provided to each user in a particular license type or each user may be assigned a suitable named user license. As such, across the enterprise, a significant variance in installed license types of software programs, which are each to be paired with a corresponding software license, may exist. However, some users may be provided with software programs, or particular license types thereof, that the users are underutilizing. As such, should additional users desire to use the software program, the enterprise generally purchases software licenses for the additional users, adding to an operating cost for provisioning the users with software programs for performing enterprise tasks. In other cases, to make a software license available for a user requesting to use the software program, the enterprise may erroneously uninstall the software program from a client device of a user who was utilizing the software application. Accordingly, it is now appreciated that there is a need for improved license analysis to enable an enterprise to efficiently distribute software licenses to users of particular software programs. Such desired management is facilitated by a license analysis program that identifies an optimum or acceptable license type or named user assignment for each user, as discussed herein.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10, in which embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG.

1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
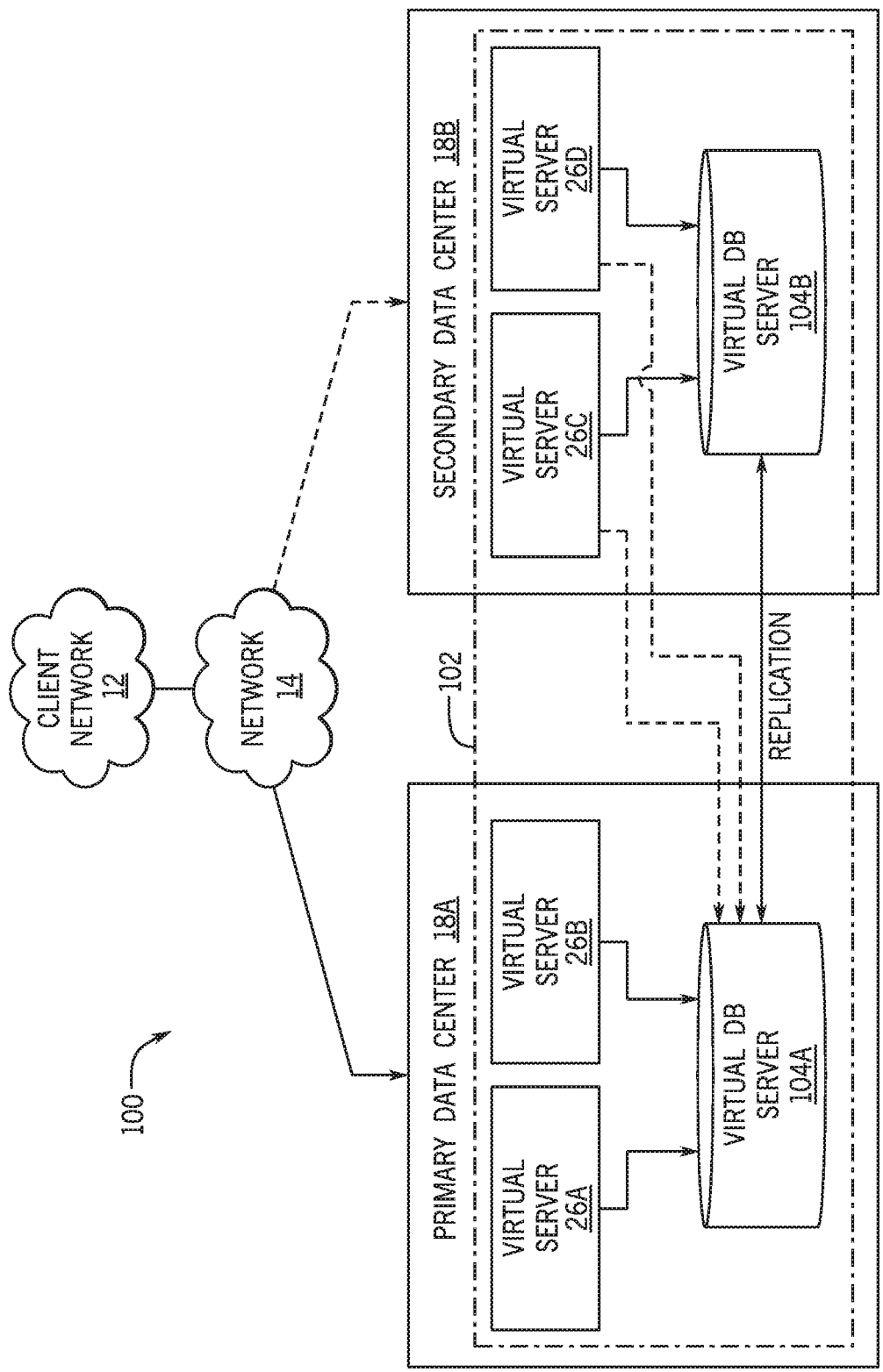
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
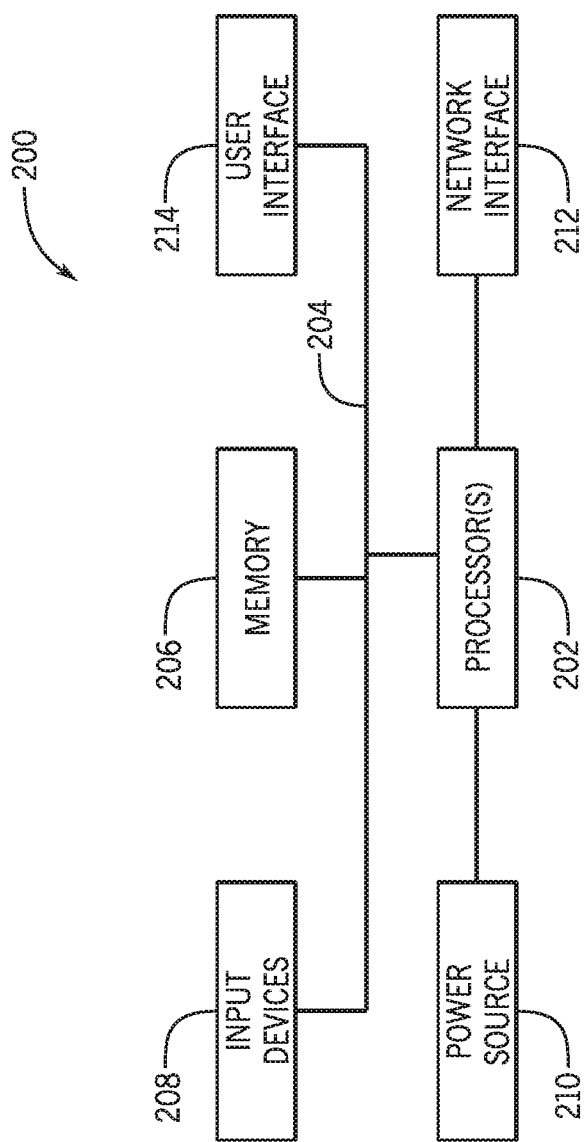
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
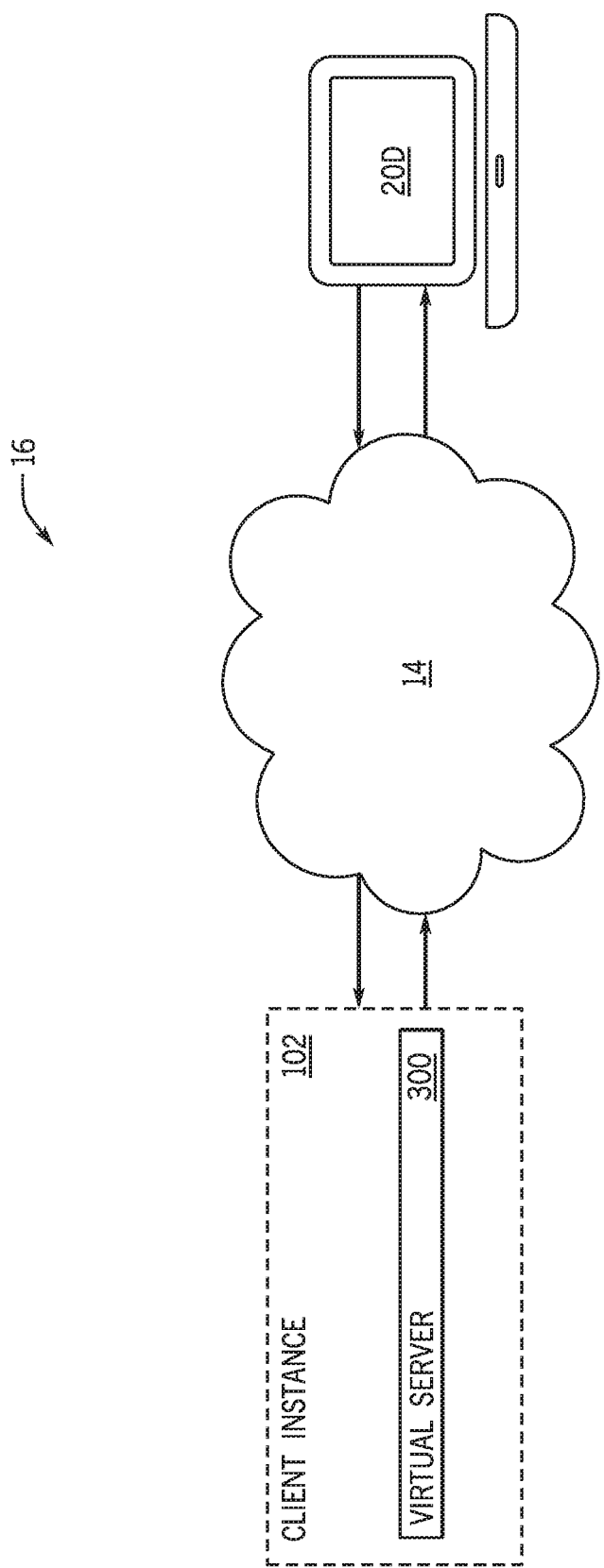
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2, and is illustrated here to show support for the disclosed license analysis functionality described herein in the context of the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

As mentioned above, present embodiments are directed to a license analysis system or license analysis software application. Such license management functionality may be supported and enhanced by deployment on a cloud-based infrastructure as described herein, such as in an multi-instance or multi-tenant architecture as described above. Thus, the license analysis system may be implemented on the cloud-based platform 16 and accessed by the agent through the client instance 102 to view an output indicating optimum or acceptable license type assignments for each user, as discussed in more detail below. However, it is to be understood that the license analysis system may alternatively be implemented locally on the client devices 20 or on any other suitable computing devices for generating acceptable license type assignments for users. Indeed, with respect to the techniques discussed herein, these techniques may be implemented in a multi-instance architecture as described herein, a multi-tenant architecture, a client-server or public network (i.e., Internet) context, or, in some instances, on a single computer or server suitably configured.

As used herein, a "software program" is a collection or grouping of files that enables end-users to perform certain enterprise tasks on their client devices 20. These software programs may be installed directly on the client devices 20 and/or accessible through the cloud-based platform 16. By way of non-limiting example, the software programs may include enterprise resource planning (ERP) software programs, such as SAP ERP™ provided by SAP SE™ Inc., of Walldorf, Germany. The software programs may additionally or alternatively include word-processing software programs, report-generating software programs, modeling software programs, communication software programs, web-browsing software programs, and/or any other software programs by which the end-users may perform work. To ensure an appropriate license type is provided for each user of the enterprise, the present techniques include the license analysis system that may collect user activity data from the enterprise, identify which functions are performed by users having each license type, and output suggested license type downgrades for users who may be downgraded to a different, lower license type without affecting their job functions.

Figure 5:
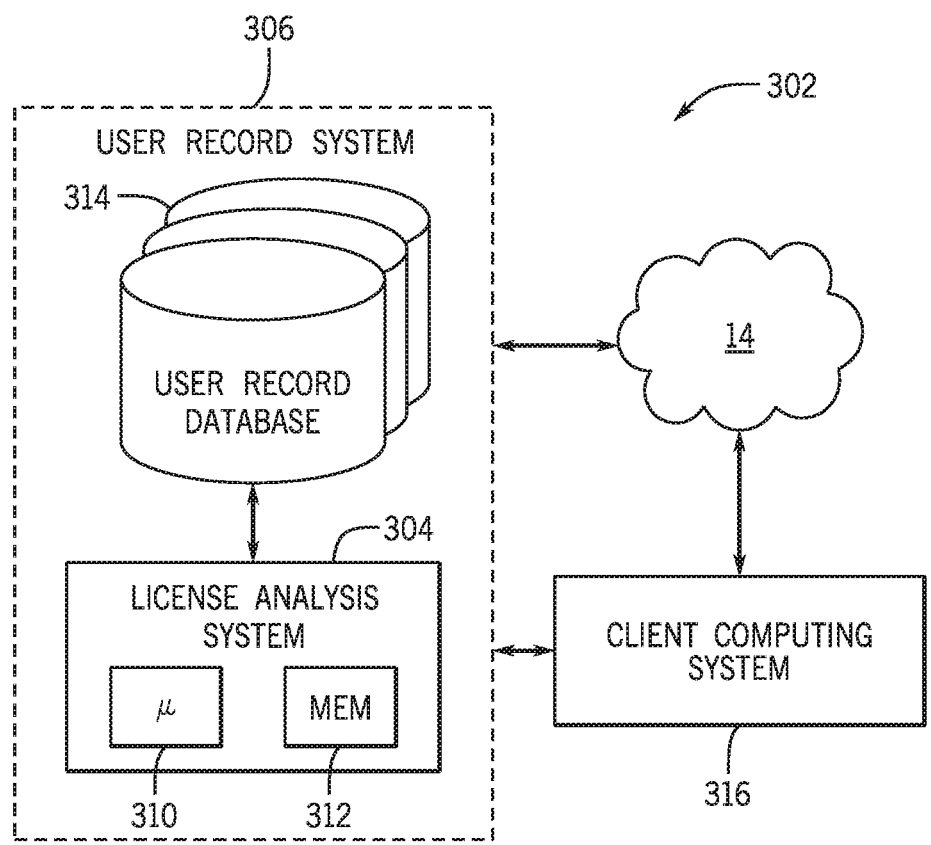
FIG. 5 is a block diagram of an embodiment of a computing system having the license analysis system, in accordance with aspects of the present disclosure.

With the preceding context in mind, FIG. 5 is a block diagram of an embodiment of a computing system 302 having a license analysis system 304, in accordance with aspects of the present disclosure. As noted above, the license analysis system 304 analyzes user activity data or client data from a user record system 306 of a client or enterprise to identify acceptable license type assignments for one or more users of the enterprise. The license analysis system 304 of the present embodiment therefore includes one or more processors 310 and a memory 312 to facilitate performance of the steps disclosed herein. The one or more processors 310 may include one or more microprocessors capable of performing instructions stored in the memory 312. Additionally or alternatively, the one or more processors 310 may include application-specific integrated circuits (ASICs), field-programmable gate arrays (FPGAs), and/or other devices designed to perform some or all of the functions discussed herein without calling instructions from the memory 312. The memory 312 may include any tangible, non-transitory, and computer-readable storage media having machine-readable instructions stored thereon. Moreover, it is to be understood that the license analysis system 304 may additionally or alternatively include any other components suitable for accessing the user record system 306 and other components discussed herein. For example, the license analysis system 304 may include input devices, a power source, a network interface, a user interface, and/or other computer components useful in performing the functions described herein.

The user record system 306 may be provided by any suitable ERP software program, such as SAP ERP™ provided by SAP SE™ Inc., of Walldorf, Germany. The user record system 306 of the present embodiment includes a user record database 314 and the license analysis system 304. The user record database 314 may store data indicative of user permissions and activities within the user record system 306, such as those performed within the ERP software program via a client computing system 316. Moreover, although illustrated with the license analysis system 304 included within the user record system 306, it should be understood that the license analysis system 304 may alternatively be employed within the client computing system 316 or remotely via the network 14.

Figure 6:
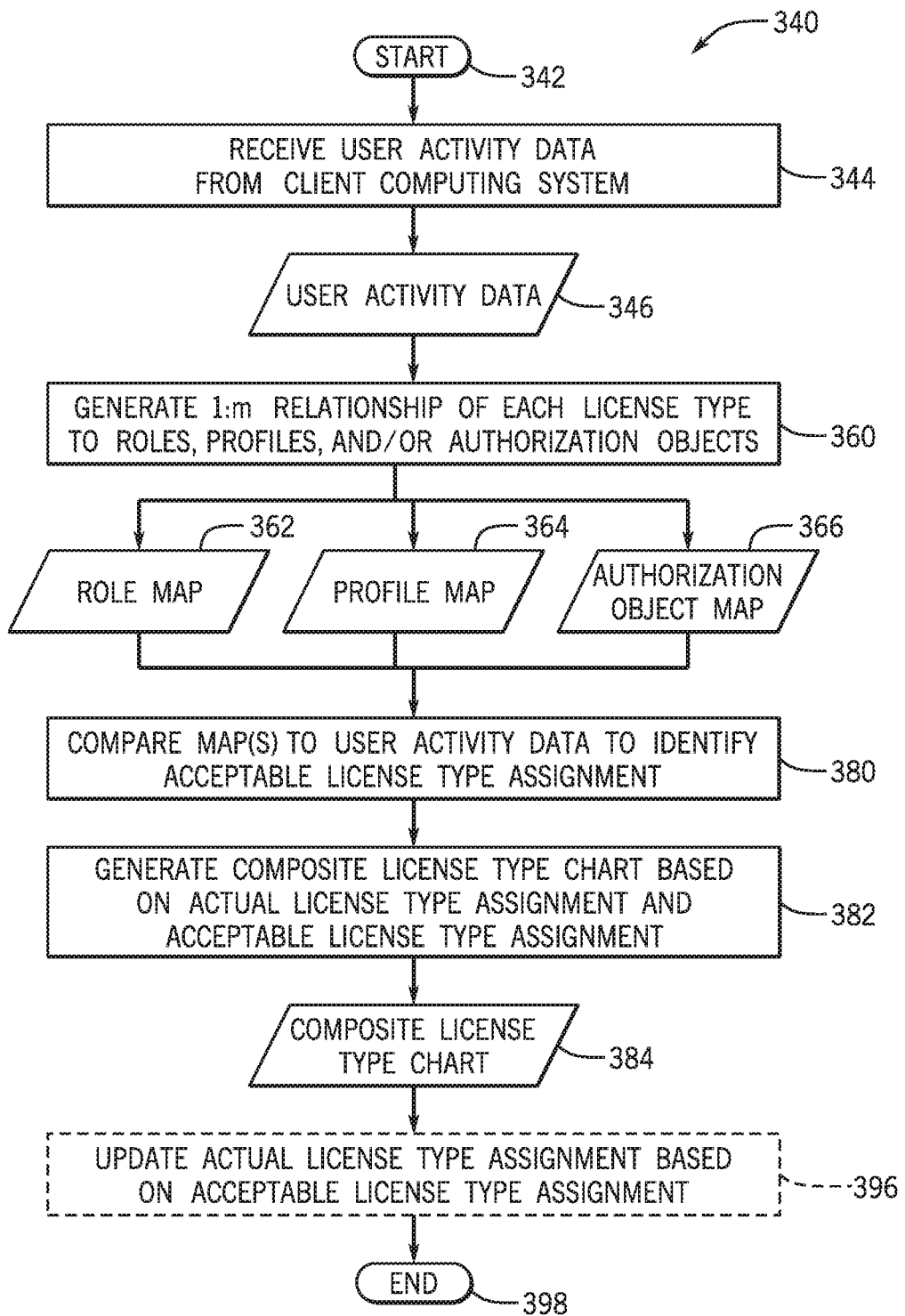
FIG. 6 is a flow diagram of an embodiment of a process for analyzing software licenses via the license analysis system, in accordance with aspects of the present disclosure.

With the above context of the license analysis system 304 in mind, FIG. 6 is a flow diagram of an embodiment of a process 340 depicting use of the license analysis system 304 for analyzing software licenses, in accordance with aspects of the present disclosure. The steps illustrated in the process 340 are meant to facilitate discussion and are not intended to limit the scope of this disclosure, because additional steps may be performed, certain steps may be omitted, and the illustrated steps may be performed in an alternative order or in parallel, where appropriate. The process 340 may be implemented by the license analysis system 304 via the one or more processors 310, hereinafter referred to as the processor 310 for simplicity. However, in other embodiments, the license analysis system 304 may implement the process 340 via any suitable device, client instance, network, cloud-based platform, or a combination thereof.

To start (block 342) the process 340, the processor 310 of the license analysis system 304 receives (block 344) user activity data 346 or client data from the client computing system 316. The user activity data 346 may be received directly from a storage component of the client computing system 316 or received indirectly from the user record database 314 of the user record system 306 communicatively coupled to the client computing system 316. As noted herein, the user activity data 346 includes data indicative of client-defined assignments of license types and user assignments to each user of the enterprise.

In some embodiments, the user assignments include roles, profiles, and/or authorization objects assigned to each user. As discussed in more detail with reference to FIGS. 9-12, the user assignments form a hierarchy of authorizations that define work functions a user may perform within the software program. For example, at the highest level of the hierarchy, profiles are indicative of one or more roles associated with a user within the software program. Moreover, at the middle level of the hierarchy, roles are indicative of one or more work actions or authorization objects a user may perform with the software program. At the lowest level of the hierarchy, authorization objects are indicative of one or more permitted actions that a user performs within the software program. Although the illustrative examples discussed herein focus on roles, it is to be understood that, based on the relationship between each of the user assignments, profiles and authorization objects may also be analyzed together or separately with roles to determine acceptable license type assignments for users. Indeed, when considering user assignments of at least two levels of the hierarchy, a degree of desired redundancy may further improve recommendations output by the license analysis system 304.

Turning briefly to FIG. 7, which is a schematic diagram of an embodiment of relationships used and created by the license analysis system 304, and in accordance with aspects of the present disclosure, an example embodiment of the user activity data 346 is illustrated. For example, with respect to analyzing license types based on role data, the user activity data 346 provides a list of users 350, a list of roles 352, and a list of license types 354 for each user. That is, the user activity data 346 includes a plurality of license types and a plurality of user assignments, in this case, roles, associated with each license type. In some cases, the license analysis system 304 may suggest acceptable license type assignments for users, such as "Susie," who are not initially assigned a license type.

Returning to FIG. 6, the processor 310 generates (block 360) a 1:m mapping or a 1:m relationship of each license type to the roles, the profiles, and/or the authorization objects associated with each user. Thus, the 1:m mapping may take the form of one or more of a role map 362, a profile map 364, and an authorization object map 366. Returning again to FIG. 7, the illustrated embodiment of the role map 362 generated by the license analysis system 304 includes a list of license types 370 and a list of the one or more roles 372 associated with each respective license type 370. That is, by analyzing the user activity data 346, the license analysis system 304 may efficiently determine which roles are performed by users having which license types, and then generate the role map 362 illustrating these associations. Moreover, the license analysis system 304 may generate similar maps or relationships based on the profiles and/or authorization objects assigned to each user.

Returning again to FIG. 6, the processor 310 of the license analysis system 304 compares (block 380) the appropriate maps 362, 364, 366 to the user activity data 346 to identify an acceptable license type assignment for each user. That is, the license analysis system 304 may identify which roles each user performs, compare the roles each user performs to the role map 362, and generate the acceptable license type assignment for each user based on the roles each user performs. In more detail, the license analysis system 304 may match the user with a lowest-level or lowest-cost license type assignment that enables the user to continue performing previously-performed functions within the software program.

By way of an example, the user activity data 346 may specify that a first license type assignment is associated with a first role and a second role, and that a second license type assignment is associated with the second role and a third role. Then, when analyzing data related to a user having the first license type assignment, the license analysis system 304 may determine that the user performs actions associated with the second role and does not perform actions associated with the first role. As such, the license analysis system 304 determines that a best-fit or acceptable license type assignment for the user is the second license type assignment.

Then, the processor 310 of the license analysis system 304 generates (block 382) a composite license type chart 384 or composite license type output based on an actual license type assignment for each user and the acceptable license type assignment for each user. As illustrated in FIG. 7, the composite license type chart 384 includes a list of users 386, a list of roles 388 performed by each user, an actual license type assignment 390 of each user, and an acceptable license type assignment 392 for each user. Moreover, the composite license type chart 384 includes a list of potential savings 394 or cost savings associated with updating the actual license type assignment 390 of each user to the acceptable license type assignment 392 for each user 386. For example, if "Bob" were switched from a Professional license type to a Limited Professional license type, Bob may continue to perform functions associated with Role1, with a license cost savings to the enterprise of $250. Alternatively, because "Susie" performs Role4 and the role map 362 indicates Role4 is only performable with the Professional license type, the composite license type chart indicates that Susie's acceptable license type assignment is the Professional license type, such that potential savings related to Susie are zero dollars.

Although represented as a chart, it should be understood that the composite license type chart 384 may be generated as any suitable output, including a list or data indicative of suggested changes to license types, either with or without the actual license type assignment 390 and/or the potential savings 394. Moreover, for users having a respective acceptable license type assignment 392 that differs from their actual license type assignment, the license analysis system 304 may emphasize, highlight, bold, recolor, or otherwise indicate that modifying the license type assignment of these users may provide non-zero license cost savings.

In some embodiments, the composite license type chart 384 is generated and provided to a viewer who accesses the license analysis system 304. Indeed, the composite license type chart 384 may be generated and output on a scheduled or periodic basis, such as at a specified time or day of the week. In other embodiments, the composite license type chart 384 is generated based on a demand by a requester, who is then provided with the composite license type chart 384. The viewer or the requester may therefore manually update the license type assignments of the users to their acceptable license type assignments when the next re-licensing period arrives. Enabling manual updating of the license type assignments may enable an administrator to verify the changes suggested by the license analysis system 304, thus blocking or preventing license type downgrades for users who may not fully utilize the software program at all times, but periodically require greater functionalities from the software program.

Alternatively, and again referring back to FIG. 6, the processor 310 of the license analysis system 304 may automatically update (block 396) the actual license type assignment for each user based on their respective acceptable license type assignments to end (block 398) the process 340. Accordingly, the license analysis system 304 provides efficient license analysis based on actual work performed by the users to enable license redistribution and/or licensing cost reductions to the enterprise.

Figure 8:
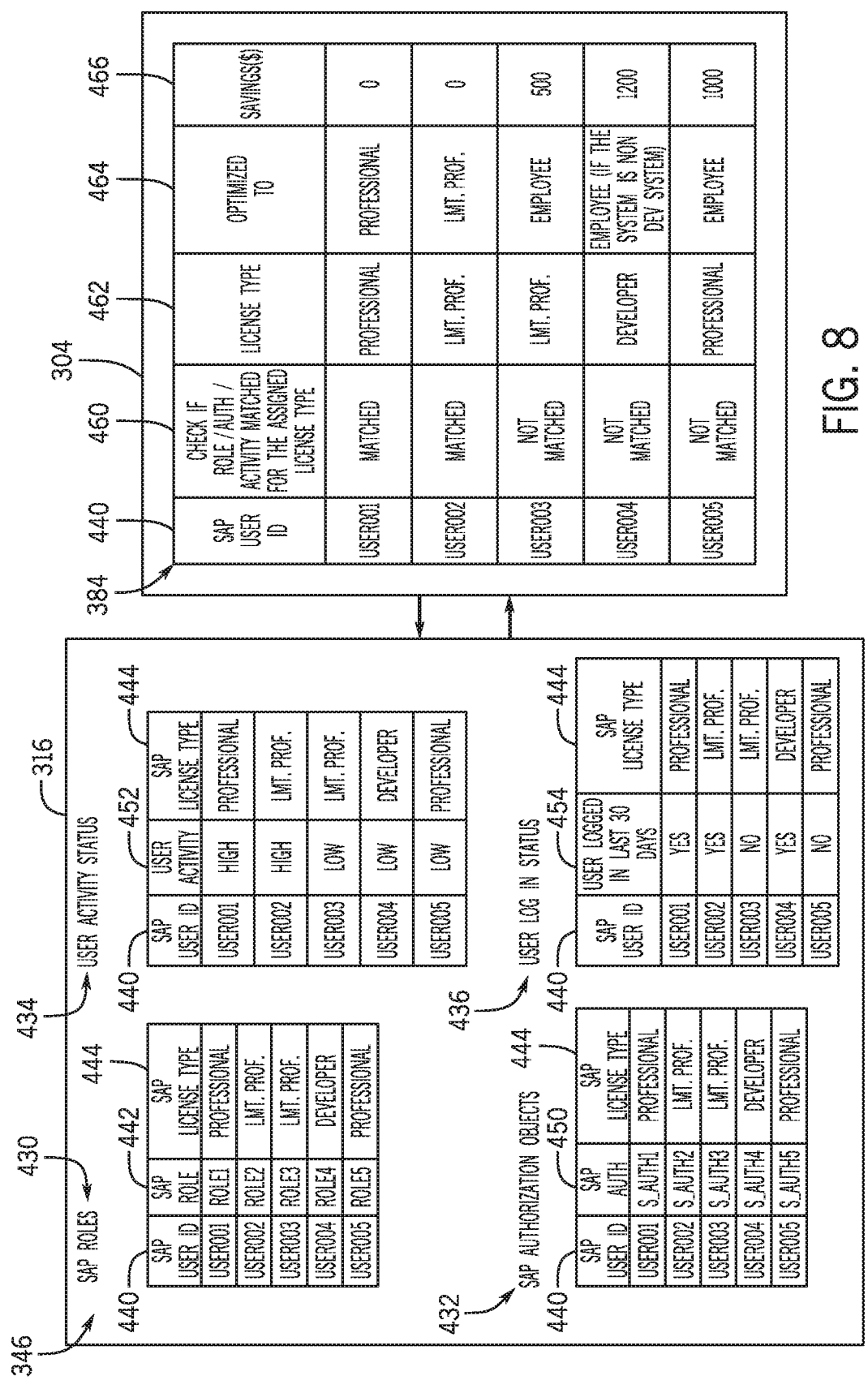
FIG. 8 is a schematic diagram illustrating an example of data transmitted to and from a client computing system to facilitate operations of the license analysis system, in accordance with aspects of the present disclosure.

By way of another example, FIG. 8 is a schematic diagram illustrating an example of data transmitted to and from the client computing system 316 to facilitate operations of the license analysis system 304, in accordance with aspects of the present disclosure. In the illustrated embodiment, the client computing system 316 provides the license analysis system 304 with an embodiment of the user activity data 346 that includes a role assignment table 430, an authorization object assignment table 432, a user activity status table 434, and a user log in status table 436. The user activity data 346 may be collected by the user record system 306, such as SAP ERP™, during business operations of the enterprise. Moreover, although indicated as SAP ERP™ roles and authorization objects, it should be understood that the user activity data 346 may additionally or alternatively include any user definitions or authorizations native to any suitable ERP software programs.

As discussed with reference to FIG. 7, the role assignment table 430 includes a list of users 440, a list of roles 442 associated with each user, and a list of license types 444 for each user. Similarly, the authorization object assignment table 432 includes the list of users 440, a list of authorization objects 450 associated with each user, and the list of license types 444 for each user. Moreover, the user activity status table 434 indicates a list of an activity level 452 for each user, and the user log in status table 436 includes a list of log in data 454 that indicates whether each user has accessed the user record system 306 or software program within a threshold time period. In some embodiments, a user may be deemed a high activity user within the user activity status table 434 if the user performs more than a threshold number of operations with the software program within a threshold time period.

With the illustrated embodiment of the user activity data 346, the license analysis system 304 may determine an acceptable license types for each user. Indeed, as discussed above with reference to FIG. 6, the license analysis system 304 may generate the role map 362 and the authorization object map 366 based on the user activity data 346 and then perform a comparison to determine whether users may be downgraded to a lower license type. Moreover, with the user activity status table 434 and the user log in status table 436, the license analysis system 304 may further verify whether activities of each user within the software program confirm the determined acceptable license types for each user. That is, in some embodiments, the license analysis system 304 generates the composite license type chart 384 that includes a list of comparison results 460 indicating whether the roles, authorization objects, activity level, and/or log in status for a user are matched with their current or actual license type 462. Based on the comparison results 460, the license analysis system 304 may therefore generate a list of optimized or acceptable license types 464 for each user. As mentioned above, the composite license type chart 384 may also include a list of savings 466 associated with switching users to their respective acceptable license type.

In more detail, and by way of example, the license analysis system 304 may determine whether each user has accessed the software program within a first threshold time period, determine whether each user has performed a threshold number of actions via the software program within a second threshold time period, or both. Then, in response to one or more users not accessing the software program within the first threshold time period, not performing the threshold number of actions within the second threshold time period, or both, the license analysis system 304 may downgrade the acceptable license type assignment for these users. Alternatively, if a user has both a high activity level and/or has logged into the software program within a suitable time threshold, the license analysis system 304 may maintain the acceptable license type assignment for the user.

Figure 9:
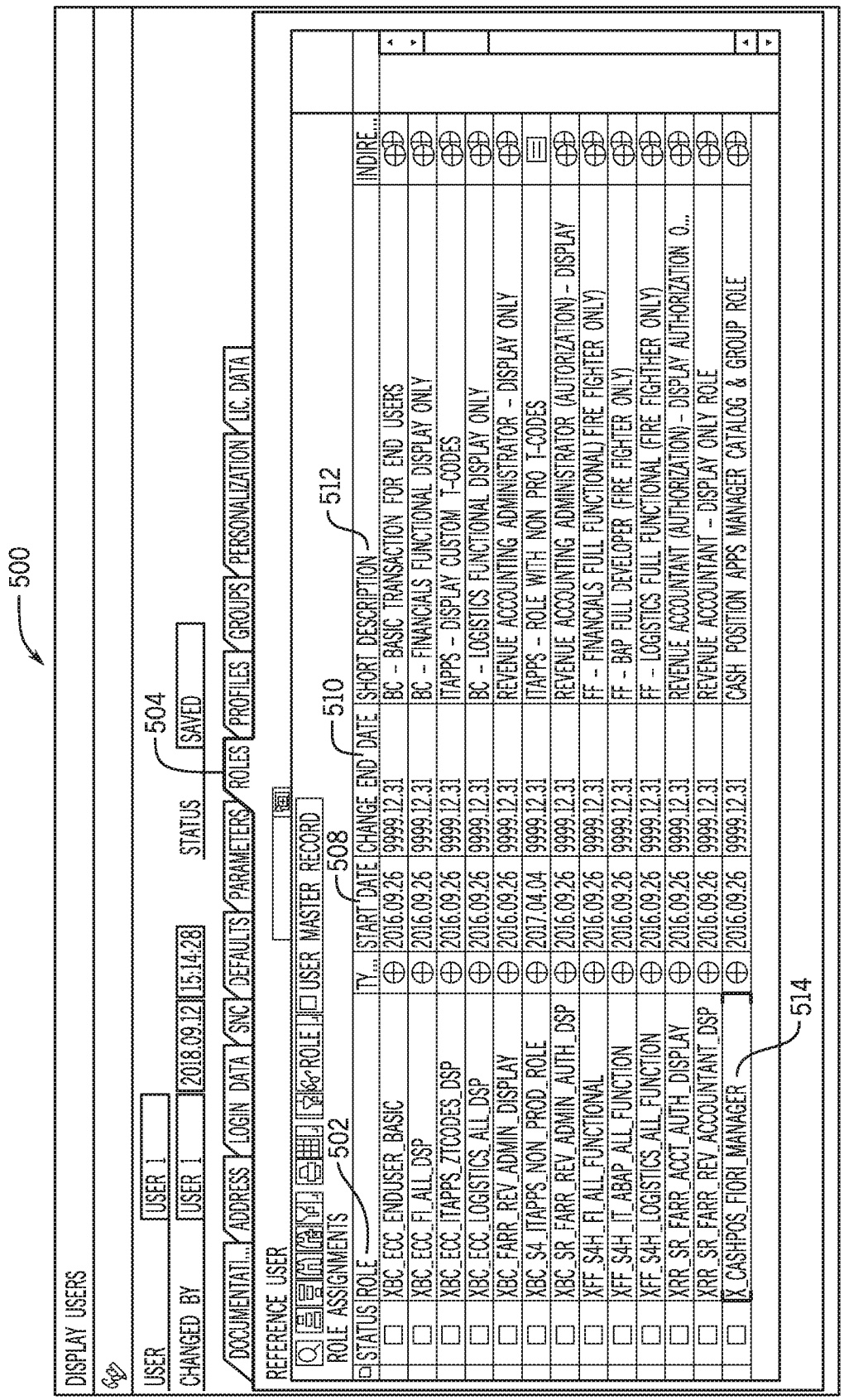
FIG. 9 is a screenshot of an embodiment of a user interface having a list of user roles that may be analyzed by the license analysis system, in accordance with aspects of the present disclosure.

With the above understanding of the license analysis system 304 in mind, more details are provide below with respect to the hierarchy between profiles, roles, and authorization objects, collectively referred to as the user assignments, that may be analyzed by the license analysis system 304. Indeed, FIG. 9 is a screenshot of an embodiment of a user interface 500 having a list of roles 502 that may be analyzed by the license analysis system 304, in accordance with aspects of the present disclosure. In some embodiments, the user interface 500 is a screen of the software program that is displayed on a suitable client device 20 in response to a user selecting a role tab 504. As previously mentioned, the roles are indicative of work functions a user is authorized to perform within the software program. The user interface 500 also includes a start date 508, an end date 510, and a short description 512 for each role. For example, an X_CASHPOS_PIORI_MANAGER role 514 was assigned to User1 on 2016.09.26 and is expected to remain assigned to User1 indefinitely.

FIG. 10 is a screenshot of an embodiment of a user interface 530 having a hierarchy of authorization objects 532 associated with the X_CASHPOS_PIORI_MANAGER role 514 that may be analyzed by the license analysis system 304, in accordance with aspects of the present disclosure. The user interface 530 may be displayed on the client device 20 in response to a user selecting the X_CASHPOS_PIORI_MANAGER role 514 from the user interface 500 of FIG. 9, thus revealing the authorization objects 532 associated with the role. For example, a sub-tree of the authorization objects 532 indicate what particular actions User1 is authorized to perform within the software program, such as generating, editing, viewing, approving, and/or sharing various data, requests, and so forth.

Moreover, FIG. 11 is a screenshot of an embodiment of a user interface 550 having a list of profiles 552 that may be analyzed by the license analysis system 304, in accordance with aspects of the present disclosure. In some embodiments, the user interface 500 is a screen of the software program that is displayed on the client device 20 in response to a user selecting a profile tab 554. As previously mentioned, the profiles are at the highest level of the authorization hierarchy within the software program, therefore indicative of roles associated with a user within the software program.

Figure 12:
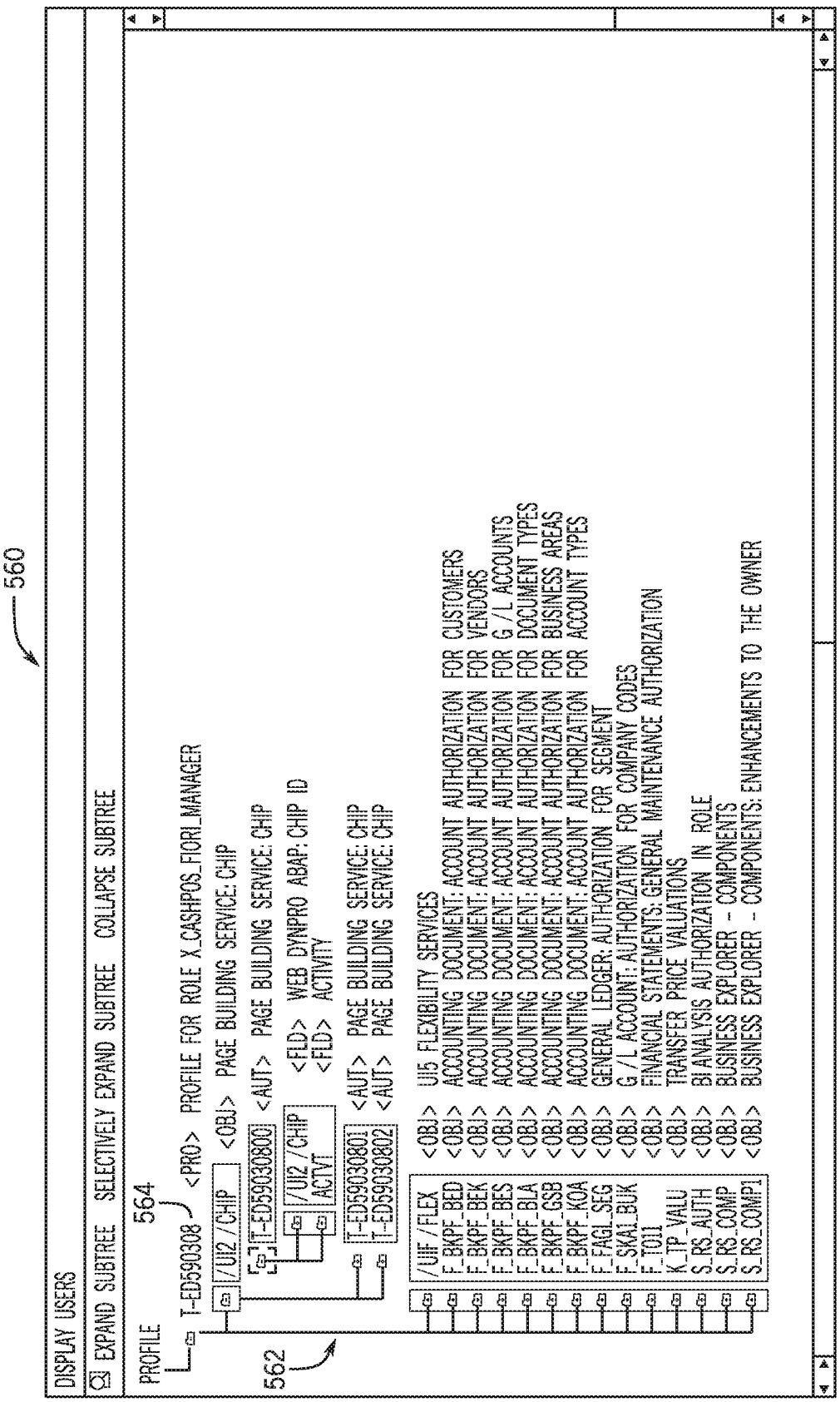
FIG. 12 is a screenshot of an embodiment of a user interface having a hierarchy of user roles associated with a user profile that may be analyzed by the license analysis system, in accordance with aspects of the present disclosure.

In more detail, FIG. 12 is a screenshot of an embodiment of a user interface 560 having a hierarchy of roles 562 associated with a particular profile 564, namely, T-ED590308, that may be analyzed by the license analysis system 304, in accordance with aspects of the present disclosure. The user interface 560 may be displayed on the client device 20 in response to a user selecting the T-ED590308 role from the user interface 550 of FIG. 11, thus revealing the roles 562 associated with the particular profile 564.

As discussed herein, software license management for an enterprise may be facilitated by multiple techniques and features. A license analysis system 304 may be implemented on client devices or a local server to receive user activity data 346 from the enterprise or client, including a client-defined association between license types and user assignments associated with each license type. The license analysis system 304 may analyze the user activity data 346 to generate a 1:m relationship or map of each license type to a number of profiles, roles, and authorization objects within the enterprise. The license analysis system 304 may then compare the 1:m relationship or the appropriate maps to the user activity data to identify an optimum license type assignment for each user that provides the appropriate authorizations according to their historic software usage. Moreover, the license analysis system 304 may consider specific user activity, such as whether each user has recently logged in or has a high activity status within the software program, when determining acceptable license type assignments for each user. Accordingly, the license analysis system 304 provides efficient license management based on actual work performed by the users to enable license redistribution and/or licensing cost reductions to the enterprise.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
one or more remote client networks comprising one or more client devices that are each configured to access a software program;
a client instance hosted by one or more data centers, wherein the client instance is accessible by the one or more remote client networks, and wherein the system is configured to implement a license analysis software application on one or more hardware or virtual devices to perform operations comprising:
receiving user activity data related to the software program from the one or more client devices, wherein the user activity data comprises an actual license type assignment of each user of one or more users, a plurality of license types, and a plurality of user assignments associated with each license type, and wherein the plurality of user assignments comprises a plurality of roles, a plurality of profiles, or a plurality of authorization objects, wherein each authorization object of the plurality of authorization objects is indicative of one or more permitted actions that a user performs within the software program;
analysing the user activity data to determine an activity status of each user, wherein the activity status is indicative of one or more specific actions that the user performs within the software program associated with one or more license types of the plurality of license types;
generating a 1:m relationship of each license type to the plurality of user assignments;
comparing the 1:m relationship to the user activity data and the activity status to identify an acceptable license type assignment for each user;
generating a composite license type output based on the actual license type assignment of each user and the acceptable license type assignment for each user; and
providing the composite license type output to a reviewer.

2. The system of claim 1, wherein the plurality of user assignments comprises the plurality of roles, and wherein each role of the plurality of roles is indicative of one or more work actions performed by a user with the software program.

3. The system of claim 2, wherein the 1:m relationship indicates which roles of the plurality of roles are associated with each actual license type assignment.

4. The system of claim 2, wherein comparing the 1:m relationship to the user activity data to identify the acceptable license type assignment for each user of one or more users comprises:
identifying which roles of the plurality of roles each user performs;
comparing the roles each user performs to the 1:m relationship; and
generating the acceptable license type assignment for each user based on the roles each user performs.

5. The system of claim 4, wherein the 1:m relationship indicates that a first license type assignment is associated with a first role and a second role and that a second license type assignment is associated with the second role and a third role, wherein the system is configured to employ the license analysis software application to perform operations comprising determining that a user having the first license type assignment and performing functions associated with the second role has an acceptable license type assignment comprising the second license type assignment.

6. The system of claim 1, wherein the plurality of user assignments comprises the plurality of profiles, and wherein each profile of the plurality of profiles is indicative of one or more roles associated with a user within the software program.

7. The system of claim 1, wherein comparing the 1:m relationship to the user activity data to identify the acceptable license type assignment for each user comprises:
analyzing the user activity data to determine whether each user has a high activity status indicative of performing the threshold number of actions via the software program within the threshold time period; and
in response to determining that one or more users do not have the high activity status, adjust the acceptable license type assignment for the one or more users to a lower acceptable license type.

8. The system of claim 1, wherein comparing the 1:m relationship to the user activity data to identify the acceptable license type assignment for each user comprises:
analyzing a last access date for each user to determine whether each user has accessed the software program within a threshold time period; and
in response to determining that one or more users have accessed the software program within the threshold time period, maintain the acceptable license type assignment for the one or more users.

9. The system of claim 1, wherein the composite license type output comprises a chart displaying the actual license type assignment of each user and the acceptable license type assignment for each user.

10. The system of claim 9, wherein the chart comprises a cost savings associated with updating the actual license type assignment of each user to the acceptable license type assignment for each user.

11. A method, comprising:
receiving, from one or more client devices, client data comprising a plurality of license types for a software program and a plurality of roles associated with each license type;
receiving, from the one or more client devices, a plurality of actual license type assignments for each user of a plurality of users that access the software program;
receiving user activity data indicative of an activity status of each user, wherein the activity status is indicative of one or more specific actions that the user performs within the software program associated with one or more license types of the plurality of license types;
generating, via one or more processors, a 1:m relationship of each license type of the plurality of license types to one or more roles of the plurality of roles;
comparing, via the one or more processors, the 1:m relationship to the client data and the user activity data to identify an acceptable license type assignment for each user;
generating, via the one or more processors, a composite license type output based on the actual license type assignment of each user and the acceptable license type assignment for each user; and providing, via one or more communication components, the composite license type output to a reviewer.

12. The method of claim 11, wherein comparing the 1:m relationship to the client data to identify the acceptable license type assignment for each user comprises:
   identifying which roles of the plurality of roles each user performs;
   comparing the roles each user performs to the 1:m relationship; and
   generating the acceptable license type assignment for each user based on the roles each user performs.

13. The method of claim 11, wherein comparing the 1:m relationship to the client data to identify the acceptable license type assignment for each user comprises:
   determining whether each user has accessed the software program within a first threshold time period, determining whether each user has performed a threshold number of actions via the software program within a second threshold time period, or both; and
   downgrading the acceptable license type assignment for one or more users in response to the one or more users not accessing the software program within the first threshold time period, not performing the threshold number of actions within the second threshold time period, or both.

14. The method of claim 11, wherein the one or more processors are part of a cloud-based service platform.

15. The method of claim 11, wherein each role of the plurality of roles is indicative of one or more work actions performed by a user with the software program.

16. A tangible, non-transitory, machine-readable medium comprising machine-readable instructions, wherein the machine-readable instructions, when executed by one or more processors, cause the one or more processors to perform operations comprising:
   receiving user activity data related to a software program from one or more client devices, wherein the user activity data comprises an actual license type assignment of each user of one or more users, a plurality of license types, and a plurality of roles associated with each license type, and wherein each role of the plurality of roles is indicative of one or more work actions performed by a user with the software program;
   analysing the user activity data to determine an activity status of each user, wherein the activity status is indicative of one or more specific actions that the user performs within the software program associated with one or more license types of the plurality of license types;
   generating a 1:m relationship of each license type to the plurality of roles;
   comparing the 1:m relationship to the user activity data and the activity status to identify an acceptable license type assignment for each user by:
      identifying which roles of the plurality of roles each user performs;
      comparing the roles each user performs to the 1:m relationship; and
      generating the acceptable license type assignment for each user based on the roles each user performs; and
   providing an output comprising the acceptable license type assignment for each user to a reviewer.

17. The tangible, non-transitory, machine-readable medium of claim 16, wherein the machine-readable instructions, when executed by the one or more processors, cause the one or more processors to generate a composite license type chart displaying the actual license type assignment of each user and the acceptable license type assignment for each user, wherein the composite license type chart comprises the output provided to the reviewer.

18. The tangible, non-transitory, machine-readable medium of claim 16, wherein the machine-readable instructions, when executed by the one or more processors, cause the one or more processors to provide the output on a scheduled or periodic basis.

19. The tangible, non-transitory, machine-readable medium of claim 16, wherein the one or more processors are local to the one or more client devices.

20. The tangible, non-transitory, machine-readable medium of claim 16, wherein the user activity data further comprises a plurality of authorization objects, wherein each authorization object of the plurality of authorization objects is indicative of one or more permitted actions that a user performs within the software program.

* * * * *